Nov. 26, 1957　　　L. S. KRULWICH　　　2,814,163
GLASS CUTTING APPARATUS
Filed March 8, 1952
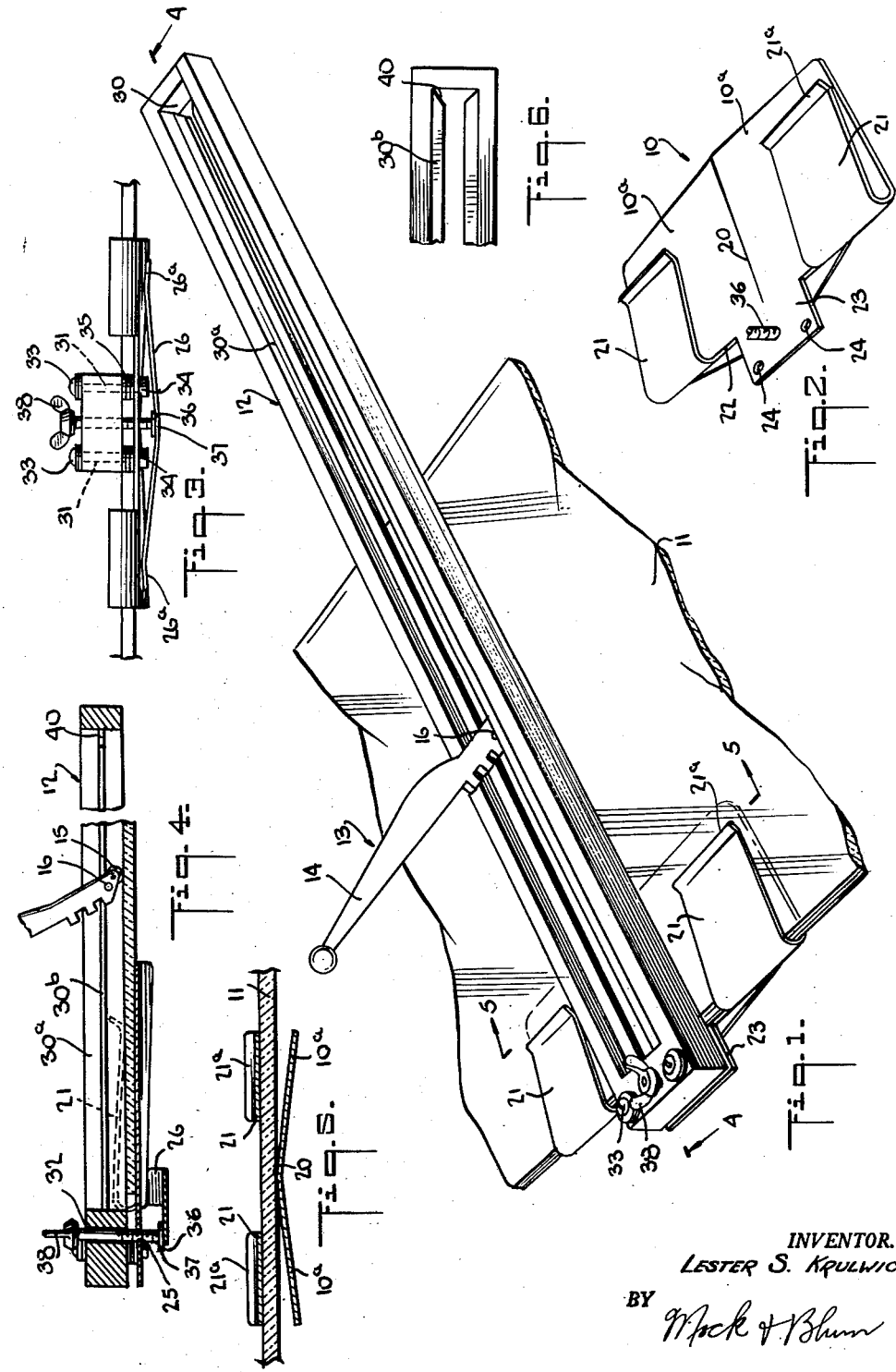
INVENTOR.
LESTER S. KRULWICH
BY
ATTORNEYS

United States Patent Office 2,814,163
Patented Nov. 26, 1957

2,814,163

GLASS CUTTING APPARATUS

Lester S. Krulwich, New York, N. Y.

Application March 8, 1952, Serial No. 275,519

6 Claims. (Cl. 49—52)

This invention relates to improvements in apparatus for cutting sheets of glass.

A common method of cutting a sheet of glass is to score the sheet along the desired line of cut, by means of a tool consisting of a handle and a scoring wheel turnably mounted on one end of the handle. Force is then extered upon the sheet upon either side of the score line, in order to break the sheet along the score line.

An important object of this invention is to provide an improved jig for holding a sheet of glass which is to be scored, which jig is adapted to exert a selected force automatically upon the held sheet on either side of the score line. This force is optionally sufficient by itself to break the glass along the score line. Optionally, slight additional manual force may be required to break the glass.

Another important object of this invention is to provide glass cutting apparatus including said jig, together with means associated with the jig for guiding the scoring means along a selected line.

Further objects and structural details of the invention will be apparent from the following description when read in conjunction with accompanying drawings forming a part of this specification, wherein:

Fig. 1 is a perspective view of a preferred embodiment of a jig in accordance with my invention. Fig. 1 shows the jig, an elongated guide bar upon which the jig is mounted and a pane of glass held by the jig. Fig. 1 also shows a tool which may be used to score the glass.

Fig. 2 is a perspective view of the jig alone.

Fig. 3 is a front end elevation of the assembly of Fig. 1.

Fig. 4 is a section on line 4—4 of Fig. 1.

Fig. 5 is a section on line 5—5 of Fig. 1, but with the guide bar omitted.

Fig. 6 is a fragmentary bottom elevation of the guide bar.

Upon reference to the drawings in detail, it will be noted that they show a glass cutting apparatus comprising a jig in the form of a spring plate 10, which is adapted to hold a plate of glass 11. The drawings also show an elongated mounting bar 12 for jig 10, and the drawings show illustratively a tool 13 which may be guided by bar 12 and used to score the glass sheet 11.

The basic jig 10 is clearly shown in Fig. 2 and other views and is in the form of a laterally elongated plate which is bent downwardly along a central longitudinal bend line 20. This bend line 20 divides plate 10 into wings 10a which extend laterally outwardly from the central longitudinal bend line 20. Said wings 10a are inclined downwardly at a slight angle to the horizontal, as is clearly shown in Fig. 5. Said plate 10 is provided with clips 21 which are integral therewith and which extend rearwardly from the front edge 22 of plate 10 adjacent the sides of the plate. Accordingly, said clips 21 respectively overlie the upper faces of the respective wings 10a.

Each clip 21 is spaced from wing 10a adjacent edge 22 and is normally inclined downwardly so that clip 21 meets wing 10a adjacent the rear end of the clip. The extreme rear end portion 21a of clip 21 is bent upwardly to provide a guide to insert a sheet of glass between the clip and the plate.

Plate 10 is preferably made of metal such as spring steel, so that the clips 21 connect resiliently with the wings 10a, and so that the plate may be flexed about its central longitudinal fold line 20.

Optionally and preferably, plate 20 is provided with a front extension 23 which extends forwardly from the front edge 22 and which serves as a mounting plate. Preferably, the fold line 20 terminates substantially at the front edge 22 and does not extend into the plate extension 23. Said plate extension 23 is provided with mounting holes 24 adjacent the front corners thereof, and also has a central screw-threaded hole 25.

As an optional feature of my invention, a flexible, resilient metal adjusting strap 26 extends laterally under plate 10 and has its respective end portions 26a secured to the lower faces of the respective wings 10a by any suitable means. Said strap 26 extends under hole 25 and is normally downwardly bowed.

The mounting bar 12 is preferably longitudinally elongated and of generally rectangular shape. Said mounting bar 12 preferably has a central longitudinal slot 30 therein. The side walls 30a of slot 30 optionally have longitudinally and inwardly extending tongues 30b thereon. Said tongues 30b are located intermediate the top and bottom of slot 30 (see Fig. 4). As shown in Fig. 6, said tongues 30b are cut away at the rear of slot 30 to provide an enlarged opening 40. Said bar 12 is provided at its front end with vertically extending through holes 31 corresponding to holes 24 and with a central hole 32 corresponding to hole 25.

In assembly of jig 10 and bar 12, the plate extension 23 is placed under the front end of bar 12 so that the holes 24 register respectively with holes 31. Then appropriate bolts 33 are extended through the registering holes in the respective bar 12 and jig 10 and are secured at their lower ends by nuts 34. Preferably, to accommodate the thickness of glass sheet 11 between plate 10 and bar 12, washers 35 are mounted upon the respective bolts 33 between bar 12 and plate 10. This is clearly shown in Fig. 3 and in other views.

In the event that the optional strap 26 is employed, a further bolt 36 is extended through opening 32 and is screwed through the registering opening 25, the lower end of bolt 36 being provided with a head 37 which abuts the upper face of strap 26. A head 38 is fixed to the upper end of bolt 36, above bar 12.

In the assembly, the front end of slot 30 preferably extends slightly in front of plate edge 22. Bar 12 and slot 30 preferably extend rearwardly of the rear edge of plate 10.

The illustrative cutter 13 includes handle 14 and scoring wheel 15 turnably mounted on the lower end of handle 14. Such a cutter is conventional. Optionally, as a feature of this invention, a pin 16 is mounted in handle 13 so as to extend laterally therethrough and so as to protrude laterally beyond the sides of handle 13. Said pin 16 is located slightly above the level of wheel 15 in the operating position of cutter 13. Pin 16 and wheel 15 can be extended through slot opening 40. Wheel 15 can then ride operatively upon the glass with the ends of pin 16 extending below the respective tongues 30b. Preferably, the ends of pins 16 extend to the slot walls 30a, to ensure straight line movement of wheel 15.

*Operation of the apparatus*

Fig. 5 shows the fundamental operation of jig 10 with strap 26 inactive, and without the use of mounting bar 12. The sheet of glass 11 is inserted frictionally between the respective clips 21 and plate 10, with the front edge of the glass sheet preferably abutting the front ends of clips 21. As is clearly shown in Fig. 5, sheet 11 abuts plate 10 only along the bend line 20, and is otherwise spaced from the respective wings 10a. The resilient clips 21 exert a bending force about the bend line 20, urging the side portions of the sheet downwardly toward the plate wings 10a. With the sheet of glass 11 held in jig 10, any suitable scoring device, such as the cutter 13, may be employed to score the upper face of glass sheet 11 along a line which registers vertically with the bend line 20. With the glass thus under stress along this score line, the clips 21 then place the under tension glass on either side of the score line.

Preferably, the bending force thus exerted upon the glass sheet may still be insufficient to break it along the score line. However, in that case, it is only necessary to flex the clips 21 gently manually toward the respective wings 10a in order to complete the breaking of the glass.

Optionally, the tension of the clips upon the glass may be sufficient to break the glass as the result of the scoring thereof.

Fig. 1 shows the jig employed along with the mounting bar 12. This construction is preferable, because the slot 30 registers vertically with the bend line 20. This makes it much easier to make the score line in the proper position than if no guide slot were provided. Optionally, the glass may be lubricated or marked along the center line of slot 30 prior to the scoring step.

The scoring stroke of wheel 15 may start at the extreme front end of sheet 11, by reason of the fact, pointed out above, that slot 30 extends forwardly of plate edge 22.

It will be noted that the sheet of glass 11 may be of any appropriate length, which may be much greater than the length of the jig 10. This is because once a sheet of glass has been scored, it is possible to break the glass by applying the bending force on either side of the score line, adjacent only one end of said score line. Preferably, the length of slot 30 is at least equal to the length of the glass sheet 11.

Figs. 3 and 4 show the operation of the apparatus when the optional strap 26 is employed. In these views, by turning head 38, the tension upon strap 26 may be adjusted to adjust in turn the tension of jig 10 to a point just short of the tension which will snap the glass when it has been scored. Hence, with a minimum of manual force, the glass may be broken along the score line.

While bend line 20 is shown as extending the entire length of the main portion of plate 10, it will be apparent that bend line 20 may optionally terminate rearwardly of edge 22 or forwardly of the rear edge of plate 10.

In a preferred construction, the optional strap 37 and bolt 32, the optional cutter pin 16 and the optional slot tongues 30a are omitted. This construction is economical to make and highly effective in use, and makes it possible to employ conventional glass scoring means.

I have described preferred embodiments of my invention, but it is understood that various changes may be made in the form, details, arrangements and proportions of the various parts without departing from the scope of my invention.

What I claim is:

1. A glass cutting apparatus comprising a bar, a spring plate having a front extension, means mounting said front extension of said plate upon said bar with said plate being spaced from and opposing said bar and protruding beyond the sides of said bar, said plate being bent along a line which is substantially parallel to said bar to divide said plate into two wings which diverge outwardly slightly from said bar, said bar having an elongated slot which extends rearwardly from in front of said wings of said plate to substantially the opposite end of the bar, said apparatus being adapted to receive a sheet of glass with the front end portion of said sheet of glass extending between said plate and said bar and with said bar opposing said sheet of glass along substantially the entire length of said sheet, said plate including means on either side of the bend line thereof for releasably clamping said sheet of glass against said plate with insufficient pressure to break the glass prior to scoring thereof, and means located within said slot for scoring said sheet of glass along substantially the entire length thereof, said clamping means being then adapted to exert a severing force on said sheet of glass along the score line.

2. A glass cutting apparatus according to claim 1, said glass scoring means comprising a handle, a wheel, means mounting said wheel on one end of said handle so that said wheel is turnable about an axis which is transverse to said handle, and a pin extending transversely outwardly from said handle above said wheel.

3. A jig for holding a sheet of glass for cutting thereof, said jig comprising a bar, a spring plate, means mounting one end of said plate upon said bar with said plate being spaced from and generally parallel to and opposing said bar, said plate being bent along a line which extends from a point adjacent its mounted end to its opposite end to divide said plate into two wings which diverge outwardly slightly from said bar, said bar having an elongated slot opposite said bend line, and clamping members mounted upon said plate adjacent the connected end thereof and on the face thereof proximate to said bar, on either side of said bend line, said jig being adapted to receive a sheet of glass with said sheet extending between said wings and said clamping members, said slot being sized to oppose said sheet of glass along substantially the entire length thereof, said clamping members being adapted to releasably clamp said sheet of glass against said plate on either side of said bend line with insufficient pressure to break the glass prior to scoring thereof, said slot being adapted to guide means for scoring said sheet of glass along substantially the entire length thereof, said clamping members being then adapted to tend to break said sheet of glass along said bend line.

4. A jig according to claim 3, said plate having an extension which extends beyond said clamping members, said jig also including screw means connecting said extension to said bar.

5. A jig for holding a sheet of glass for cutting thereof, said jig comprising a spring plate, said spring plate being bent to divide it into two wings which diverge slightly downwardly, clips fixed to the front edge of said plate on either side of the bend line thereof and extending rearwardly and above said wings in spaced relation thereto, and a bar fixed to the upper face of said plate at the front end thereof, said bar extending rearwardly above said plate and having a slot opposite the bend line of said plate, said slot extending from a point adjacent said front edge of said plate to substantially the opposite end of the bar, said jig being adapted to receive the front end portion of a sheet of glass between said clips and said wings with said clips respectively tensioning said sheet of glass toward the respective wings of said plate.

6. A jig for holding a sheet of glass for cutting thereof, said jig comprising a spring plate, said spring plate being bent along a line extending in the direction of its length to divide it into two wings which diverge slightly downwardly, resilient clips fixed to the front edge of said plate on either side of the bend line thereof and extending rearwardly above said wings in spaced relation thereto, and a bar fixed to the upper face of said plate at the front end thereof, said bar extending rearwardly above and in spaced relation to said plate and also above the plane of said clips and having a slot opposite said bend line, said slot extending from a point in front of said clips to substantially the opposite end of the bar, said jig being adapted to receive the front end portion of a rigid sheet of glass frictionally between said clips and said wings with said jig exerting pressure against said sheet of glass at said bend line and also at said clips and thereby tending to urge said wings of said spring plate into a common plane, said slot being adapted to serve as guide means for a glass scoring device whereby to score said sheet of glass and separate it into side portions on either side of said score line, the resilience of said spring plate then tending to urge the side portions of said sheet of glass downwardly for breaking said sheet of glass along said score line.

References Cited in the file of this patent

UNITED STATES PATENTS

| | | |
|---|---|---|
| 507,395 | Walsh | Oct. 24, 1893 |
| 1,895,754 | Finkenwirth | Jan. 31, 1933 |
| 1,932,659 | Granite | Oct. 31, 1933 |